(12) United States Patent
Yu

(10) Patent No.: US 7,356,244 B2
(45) Date of Patent: Apr. 8, 2008

(54) METHOD AND SYSTEM FOR REPLAYING VIDEO IMAGES

(75) Inventor: Young Dal Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 1107 days.

(21) Appl. No.: 10/289,884

(22) Filed: Nov. 7, 2002

(65) Prior Publication Data

US 2003/0086691 A1    May 8, 2003

(30) Foreign Application Priority Data

Nov. 8, 2001    (KR)    ............... 2001-69553

(51) Int. Cl.
*H04N 5/91* (2006.01)
(52) U.S. Cl. ............... 386/69; 725/37; 348/333.05
(58) Field of Classification Search ............ 386/95; 715/853; 369/32
See application file for complete search history.

(56) References Cited

U.S. PATENT DOCUMENTS

| | | | | |
|---|---|---|---|---|
| 5,463,601 A | * | 10/1995 | Yanagisawa | ............ 369/30.26 |
| 6,556,773 B2 | * | 4/2003 | Tsumagari et al. | ............ 386/95 |
| 6,985,669 B1 | * | 1/2006 | Unger | ............ 386/46 |
| 2003/0126599 A1 | * | 7/2003 | Novak et al. | ............ 725/32 |
| 2004/0030719 A1 | * | 2/2004 | Wei | ............ 707/104.1 |
| 2004/0128317 A1 | * | 7/2004 | Sull et al. | ............ 707/104.1 |

* cited by examiner

*Primary Examiner*—Thai Q. Tran
*Assistant Examiner*—Anner Holder
(74) *Attorney, Agent, or Firm*—Lee, Hong, Degerman, Kang & Schmadeka

(57) ABSTRACT

The present invention relates to method of replaying video images by placing a bookmark on the particular thumbnail image of the broadcast content using thumbnail method and replaying it from the position a user wants. The method of the present invention extracts a plurality of thumbnail images from a broadcast content, placing a bookmark on a thumbnail image being most recent one before the user'request for stopping replaying the broadcast content that is being replayed. Accordingly, the user is allowed to understand roughly the broadcast content watched by the user using the thumbnail image that a bookmark is placed on, and the broadcast content can be replayed.

12 Claims, 5 Drawing Sheets

METHOD AND SYSTEM FOR REPLAYING VIDEO IMAGES

BACKGROUND OF THE INVENTION

1. Field of the Invention

The present invention relates to method and system for replaying video images and more particularly, to a method of placing a bookmark on a thumbnail image.

2. Background of the Prior Art

Image media including television for providing to users various broadcast contents such as news, education, entertainment, shows, etc. are rapidly being developed.

Conventionally, televisions operate in an analog way. The analog televisions allow users only to decide whether to receive the broadcast contents transmitted from a broadcasting station. Because such analog televisions do not meet the user's various desires, digital televisions were developed.

Such digital televisions abandon the analog unidirectional communication method and employ the bi-directional communication method that enables communications with TV viewers.

The digital television is provided with high capacity hard disk that stores many broadcast contents provided from various broadcasting stations. In other words, in contrast with video cassette recorder (VCR) that stores image signals on a magnetic tape, the digital television includes digital recorder, set top box or hard disk drive (HDD) so that it can record a broadcast program having a certain running time depending on the capacitance of the hard disk without any VCR. In addition, the digital television has the general functions of the VCR such as fast forward, rewind, skip, etc.

Accordingly, a user may receive the plurality of broadcast contents from the broadcasting station and store them. The stored contents can be replayed easily at the time the user wants. On the basis of a time the user stops replaying the broadcast content, a bookmark is added on a corresponding broadcast content. Therefore, in case the broadcast content is again replayed, it is possible to replay a next image corresponding to the broadcast content to be replayed from the stopped time.

FIG. 1A shows an example of a conventional method of placing a bookmark. FIG. 1B shows an example of a conventional method of displaying a bookmark-added image.

As shown in FIG. 1A, in the conventional method of placing the bookmark, an index B82 of a position where a video stream stops is stored in case the video stream including I, B and P pictures is replayed and is stopped at somewhere. When the video stream is replayed again, it is replayed with reference to the stored index B82 from the position where it was stopped.

According to the method of placing the bookmark, however, in case a user replays a plurality of broadcast contents from the bookmark-added position without any information on the contents to be replayed, the user would not fully understand the whole broadcast content since it is difficult for the user to understand the story or the content of the video stream of the image prior to the bookmark.

And also, according to the conventional method of placing the bookmark, the broadcast contents cannot be replayed from the position prior to the bookmark since the broadcast contents can be replayed only from the position the bookmark is just placed on. Accordingly, there is an inconvenience that the user cannot skip the usually unwanted advertisements and is forced to watch the whole undesired advertisements.

SUMMARY OF THE INVENTION

Accordingly, the present invention is directed to overcome the above described problems and disadvantages.

It is an object of the present invention to provide a method of placing a bookmark using thumbnail images.

It is another object of the present invention to provide video image display method and system that help a user understand a broadcast content since the user can refer to the nearest thumbnail image before the position its video stream was stopped by the user.

It is a further object of the present invention to provide video image display method and system to allow a user to select the replay position.

To achieve these objects and other advantages and in accordance with the purpose of the invention, as embodied and broadly described herein, an embodiment of the present invention provides a method of placing a bookmark using a thumbnail image. The method comprises the steps of: (a) receiving and storing a video stream of a broadcast content requested by a user; (b) extracting the plurality of thumbnail images from the video stream, and indexing and storing the extracted thumbnail images (c) replaying the video stream of the broadcast content in response to a request for a replaying of the broadcast content selected by the user; and (d) placing a bookmark on a thumbnail image in response to the user's request for a placing of the bookmark on the current video stream, the thumbnail image being a most recent one before receiving the request for the placing of the bookmark.

The thumbnail images may be at least one of cuts, scenes, key frames and histograms.

Another embodiment of the present invention provides a method of displaying a video image comprising the steps of: (a) receiving a request for a replay of a broadcast content selected by the user so as to replay a same video stream again after stopping the video stream of the broadcast content; (b) checking whether a bookmark is placed on a thumbnail image of the broadcast content selected by the user, the thumbnail image being a most recent one before stopping replaying the broadcast content; and (c) if it is checked that the bookmark is placed on the most recent thumbnail image, replaying the broadcast content successively from the thumbnail image of the broadcast content selected by the user.

Further another embodiment of the present invention provides a method of displaying a video image comprising the steps of: (a) extracting a plurality of thumbnail images from a video stream of a broadcast content requested by a user to replay a video image, and storing indices representative of each of the thumbnail images; (b) if a request to place a bookmark is received from the user who is replaying the video stream of the broadcast content, placing the bookmark on a thumbnail image among the plurality of thumbnail images, the thumbnail image being most recent one before receiving the request for placing a bookmark; (c) if a request for a replay of the broadcast content selected from a recording list by the user is received, checking whether the bookmark is placed on the broadcast content selected by the user; and (d) if it is checked that the bookmark is placed on the broadcast content, replaying the broadcast content successively from the thumbnail image of the broadcast content selected by the user.

In extracting the thumbnail images, any one of a scene extraction, a key frame extraction and an arbitrary extraction according to a time period can be used. The method further comprises the step of: (e) displaying a recording list including at least one broadcast content deliberately recorded by the user to replay in response to request from the user to display the recording list. It is desirable that the user's request for placing a bookmark is a stop command to stop replaying the broadcast contents that is being replayed. The bookmark is moved onto a corresponding thumbnail image in response of the user's request to change the bookmark Still another embodiment of the present invention provides a video images display system comprising: means for extracting a plurality of thumbnail images from a video stream of a broadcast content requested by a user to replay a video image; means for placing a bookmark on a thumbnail image among the plurality of thumbnail images, the thumbnail image being most recent one before receiving a request for placing the bookmark; means for checking whether the bookmark is placed on the broadcast content selected by the user; means for successively replaying the broadcast content from the thumbnail image of the broadcast content selected by the user; and means for inputting a request for receiving the video stream of the broadcast content, a request for placing the bookmark, and the user's request for replaying the broadcast content selected by the user.

The video images display system further comprises: means for storing a video stream of the broadcast content, an index to the thumbnail image and a bookmark index.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention.

Figure 1A:
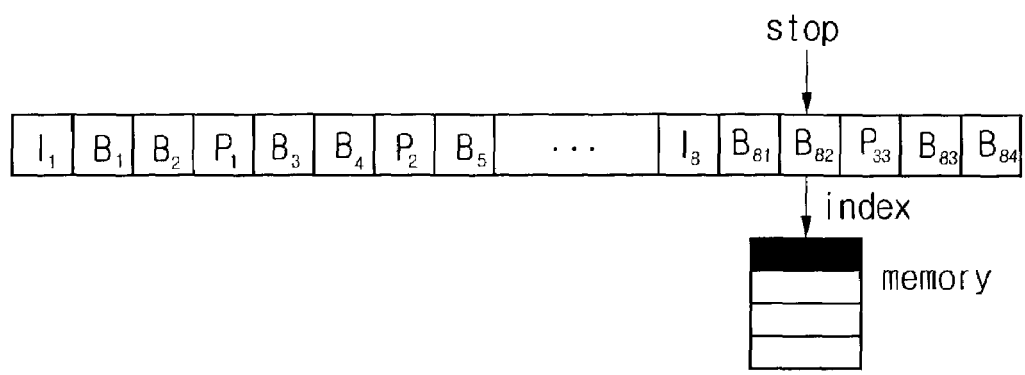
FIG. 1A shows an example of a conventional method of placing a bookmark.
Figure 1B:
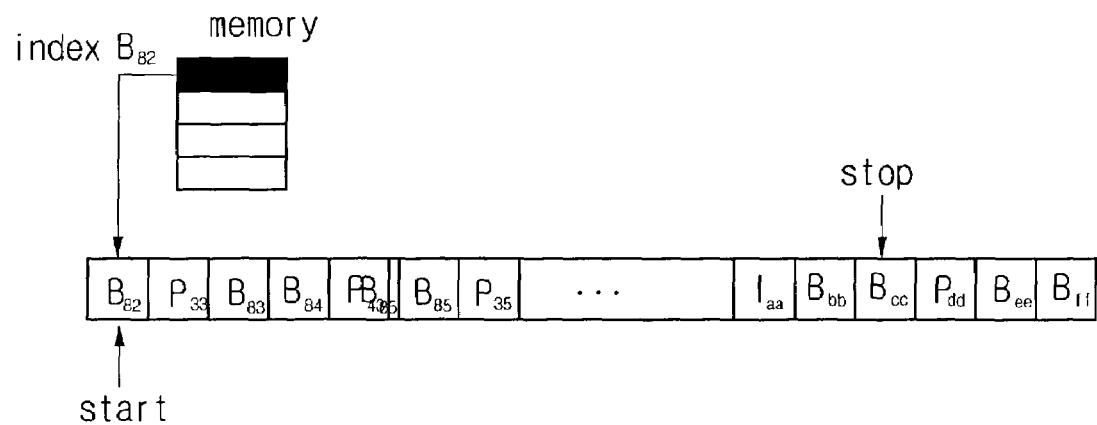
FIG. 1B shows an example of a conventional method of replaying a bookmark-placed image.
Figure 2:
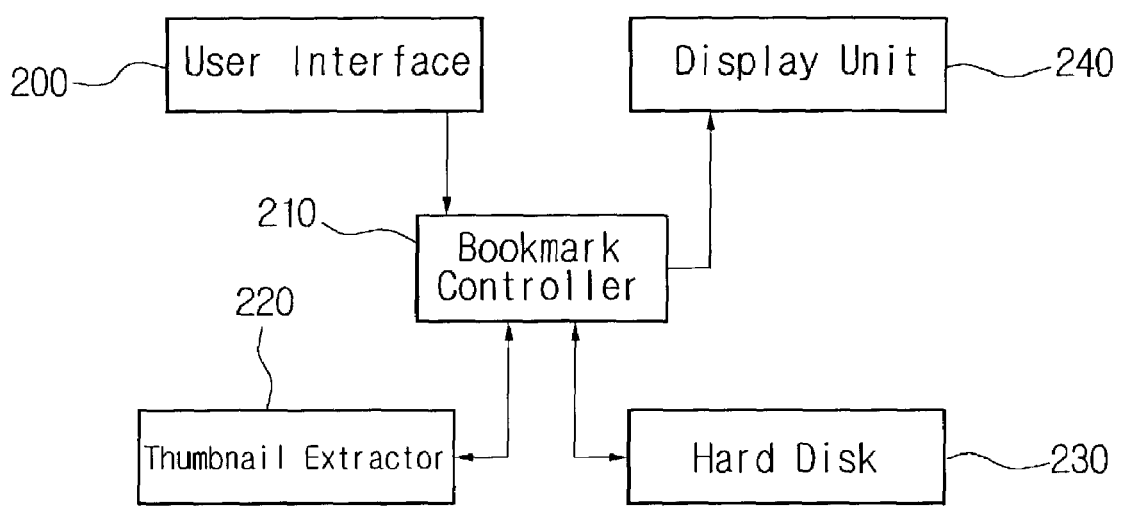
FIG. 2 shows a system for replaying a video image using thumbnail images according to a preferred embodiment of the present invention.

FIG. 2 shows a system for replaying a video image using thumbnail images according to a preferred embodiment of the present invention. Referring to FIG. 2, the system of the present invention comprises a user interface 200, a bookmark controller 210, a thumbnail extractor 220, a hard disk 230 and a display unit 240. The system includes a digital television having PVR (Personal Video Recorder) or PDR (Personal Data Recorder), and it can be any system with which a user can replay the broadcast content from the position the user wants using a bookmark.

The user interface 200 transfers to the bookmark controller 210 a series of the commands to replay the video images inputted by the user. The series of the commands includes a request for receiving the broadcast content the user wants from a plurality of broadcasting stations, a request for stopping a replay of the broadcast contents that is being replayed, a request for replaying the thumbnail image which the bookmark is placed on, and all the instructions to accomplish the objects of the present invention by controlling the bookmark controller 210.

The bookmark controller 210 receives the corresponding broadcast content through a channel in response to the user's request for receiving the broadcast content. The bookmark controller 210 places a bookmark on the thumbnail image that is the most recent one before receiving a request for placing the bookmark among the plurality of thumbnail images in response to the user's request for placing a bookmark. The thumbnail image that the bookmark is placed on is added to a recording list to be stored in the hard disk 230. The bookmark controller 210 controls to replay the broadcast content successively from the thumbnail image that the bookmark is placed on, depending on whether the bookmark is placed on the broadcast content selected by the user, if the bookmark controller 210 receives a request for replaying the broadcast contest selected by the user in the recording list. The broadcast content to be replayed is replayed by a display unit 240. The bookmark controller 210 includes all the functions to perform some operations in response of the user's requests.

A thumbnail extractor 220 extracts a plurality of thumbnail images from a video stream of a broadcast content if it receives the video stream of the broadcast content. The thumbnail images can be at least one of cut, scene, key frame and histogram. In other words, in the present invention, the thumbnail images can be extracted using a scene extraction, a key frame extraction, a histogram extraction, etc. Here, the thumbnail images are images representative of each interval from the video stream.

If the system for replaying the video image receives the video stream of the broadcast content in response to the user's request, the bookmark controller 210 sends the video stream to the thumbnail extractor 220 and the thumbnail extractor 220 extracts the plurality of thumbnail images representative of each interval from the video stream and sends the plurality of thumbnail images to the bookmark controller 210. Then the bookmark controller 210 sends the plurality of extracted thumbnail images to the hard disk 230 to store them. The hard disk 230 is a storage medium capable of storing the plurality of broadcast contents requested by the user, thumbnail images and bookmark indices.

The display unit 240 displays the broadcast contents which are being replayed in response to the user's request. The display unit 240 displays the recording list including at least one the broadcast content stored on the hard disk in response to the user's request for displaying the recording list. The display unit 240 displays the video stream successively from the thumbnail image that the bookmark is placed on and displayed according to the broadcast contents selected by the user.

Figure 3:
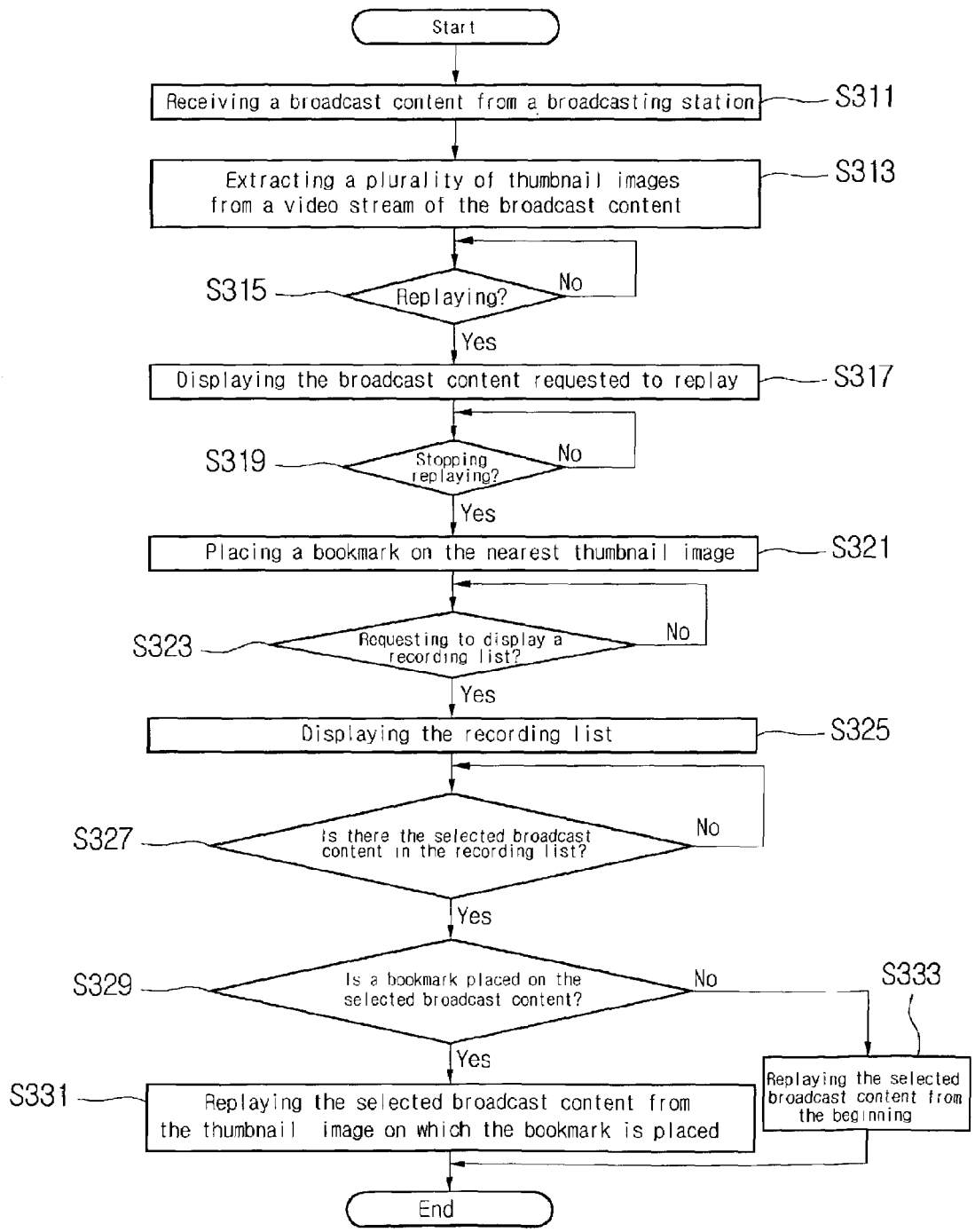
FIG. 3 is a flaw chart for replaying a video images using thumbnail images according to a preferred embodiment of the present invention.
Figure 4A:
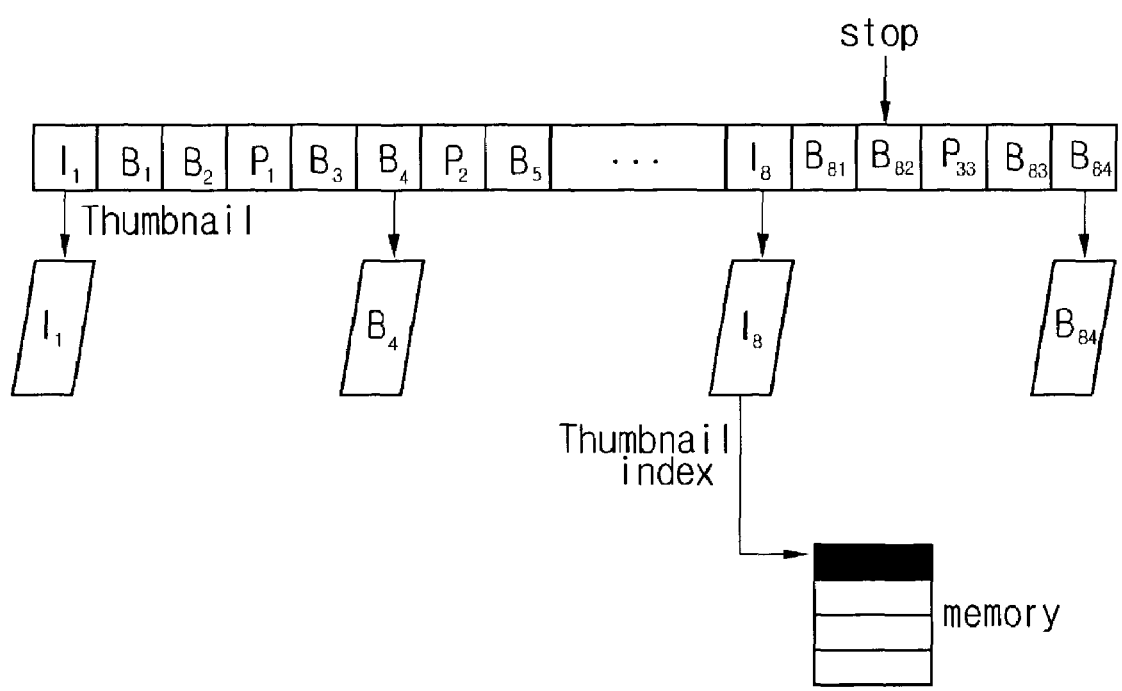
FIG. 4A shows an example of the method of placing a bookmark using thumbnail images according to a preferred embodiment of the present invention.
Figure 4B:
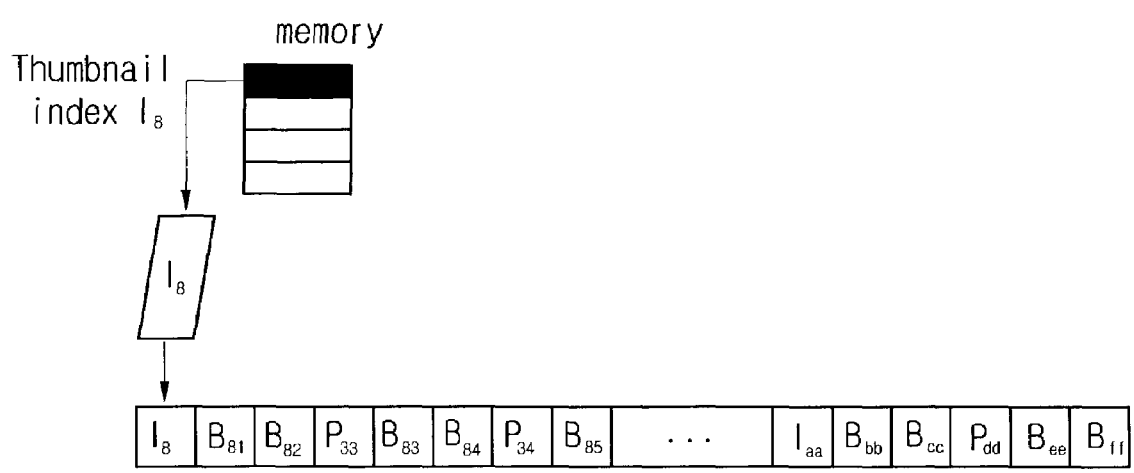
FIG. 4B shows an example of the method of replaying a video image using thumbnail images according to a preferred embodiment of the present invention.

In such a system, the method of replaying the video images will be described referring to FIG. 3. FIG. 4A shows an example of the method of placing a bookmark using thumbnail images according to a preferred embodiment of the present invention. FIG. 4B shows an example of the method of replaying a video image using thumbnail images according to a preferred embodiment of the present invention. FIG. 3 is a flaw chart for replaying a video image using thumbnail images according to a preferred embodiment of the present invention. Referring to FIG. 3, the broadcast content is received from the broadcasting station in response to the user's request for receiving them (S311). When the broadcast content is received, the bookmark controller 210 stores the video stream of the broadcast content on the hard disk 230 and sends it to the thumbnail extractor 220 simultaneously.

As shown in FIG. 4A, the thumbnail extractor 220 extracts the plurality of thumbnail images I1, B4, I8, B84, etc. representative of each interval from the video stream of the broadcast contents (S313). In this case, the thumbnail images can be cuts, scenes, key frames or histograms. Such thumbnail images may be extracted using a conventional scene extraction, a key frame extraction or a histogram extraction. The plurality of extracted thumbnails are sent to the bookmark controller 210 and the bookmark controller 210 stores the thumbnail images on the hard disk 230.

On the other hand, if the user requests through the user interface 200 to replay the broadcast contents stored on the hard disk 230 (S315), the bookmark controller 210 replays the broadcast content requested by the user from the hard disk 230 and controls the display unit 240 to display it (S317). In this case, if the user requests to stop the replay of the broadcast content (S319), as shown in FIG. 4A, the bookmark controller 210 places a bookmark on the thumbnail image 18 that is the most recent one before the time B82 receiving the stop request among the plurality of thumbnail images I1, B4, I8, B84, etc., extracted from the broadcast content that is being replayed (S321). In this way, the thumbnail image that a bookmark is placed on is added to the recording list and stored on the hard disk 230. The recording list contains at least one broadcast content which can be selected by the user.

If the user requests the recording list (S323), the bookmark controller 210 sends the recording list stored on the hard disk 230 to the display unit 240 and the display unit 240 displays it (S325). In this case, if one broadcast content is selected among one or more broadcast contents contained in the recording list (S327), the bookmark controller 210 retrieves the hard disk 230 to check whether the bookmark is placed on the broadcast contents selected by the user (S329).

If the bookmark is placed on the broadcast content, as shown in FIG. 4B, the bookmark controller 210 finds the thumbnail image 18 on which the bookmark is placed in the broadcast content selected by the user and replays the broadcast content successively, that is, in the order of I8, B81, B82, P33, etc. so that the display unit 240 display the video stream of the broadcast content (S331).

On the contrary, if the bookmark is not placed on the broadcast content, as shown in FIG. 4A, the bookmark controller 210 replays the broadcast content successively from the beginning of the broadcast content, that is, in the order of I1, B1, B2, P1, etc. so that the display unit 240 display the video stream of the broadcast content (S333).

On the other hand, the system for replaying the video image may be endowed with the function of replaying the video stream of the broadcast content from the position where a bookmark is placed by placing a bookmark on the right position the user wants instead of placing a bookmark on the thumbnail image that is the most recent one before receiving a stop request. For example, if the bookmark is placed on the broadcast content and the user selects any thumbnail image that is not the most recent one before receiving a stop request, the bookmark controller 210 places a bookmark on the thumbnail image selected by the user and stores it on the hard disk 230. Accordingly, if the user selects any thumbnail image other than the thumbnail image that is the most recent one before receiving a stop request, the broadcast content is replayed from the thumbnail image selected by the user.

As described above, the method and the system for replaying the video imagein accordance with the present invention is helpful for the user to understand wholly the broadcast content even though the users replay again the broadcast content from the thumbnail that a bookmark is placed on by placing a bookmark on the thumbnail image that is the most recent one before receiving a stop request.

Further, the method and the system of the present invention can discard the useless advertisement for the user's convenience by placing a bookmark on any thumbnail image other than the thumbnail image that is the most recent one before receiving a stop request.

Therefore, for the sake of the user's convenience, the present invention allows the user to place a bookmark on the thumbnail image that is nearest before the position the user wants while the conventional art replays the broadcast content again from the portion at which the user has requested to stop replaying it.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of placing a bookmark using thumbnail images, the method comprising the steps of:
   (a) receiving and storing a video stream of a broadcast content requested by a user;
   (b) extracting a plurality of thumbnail images from the video stream, and indexing and storing the extracted thumbnail images;
   (c) replaying the video stream of the broadcast content in response to a request for a replay of the broadcast content selected by the user;
   (d) placing a bookmark on a first thumbnail image in response to the user's request for a placing of the bookmark on the current video stream, the thumbnail image being a most recent one before receiving the request for the placing of the bookmark, regardless of the user's intention to replay the video stream from an image frame in the video stream that is subsequent in time to an image frame based on which the first thumbnail is generated, and
   (e) moving the bookmark onto a corresponding thumbnail image in response to the user's request to change the bookmark.

2. The method according to claim 1, further comprising the step of (e) adding the broadcast content to a recording list, the broadcast content including the thumbnail image on which the bookmark is placed.

3. The method according to claim 1, wherein the thumbnail images are at least one of cuts, scenes, key frames and histograms.

4. A method of replaying a video image, the method comprising the steps of:

(a) receiving a request for a replay of a broadcast content selected by the user so as to replay a same video stream again after stopping the video stream of the broadcast content;

(b) checking whether a bookmark is placed on a thumbnail image of the broadcast content selected by the user, the thumbnail image being a most recent one before stopping replaying the broadcast content; and (c) if it is checked that the bookmark is placed on the most recent thumbnail image, replaying the broadcast content successively from the thumbnail image of the broadcast content selected by the user.

5. A method of replaying a video image, the method comprising the steps of:

(a) extracting a plurality of thumbnail images from a video stream of a broadcast content requested by a user to replay a video image, and storing indices representative of each of the thumbnail images;

(b) if a request to place a bookmark is received from the user who is replaying the video stream of the broadcast content, placing the bookmark on a thumbnail image among the plurality of thumbnail images, the thumbnail image being most recent one before receiving the request for placing a bookmark;

(c) if a request for a replay of the broadcast content selected from a recording list by the user is received, checking whether the bookmark is placed on the broadcast content selected by the user;

(d) if it is checked that the bookmark is placed on the broadcast content, replaying the broadcast content successively from the thumbnail image of the broadcast content selected by the user, and (e) moving the bookmark onto a corresponding thumbnail image in response to the user's request to change the bookmark.

6. The method according to claim 5, wherein the extraction of the thumbnail images in the step (a) is performed using one of a scene extraction, a key frame extraction, and an arbitrary extraction based on a time period.

7. The method according to claim 5, further comprising the step of:

(f) displaying a recording list in response to a user's request, the recording list including at least one broadcast content deliberately recorded by the user.

8. The method according to claim 5, further comprising the step of:

(g) if it is checked that the bookmark is not placed on the broadcast content, replaying the broadcast content successively from the beginning of the broadcast content selected by the user.

9. The method according to claim 5, wherein the user's request for placing a bookmark is a stop command to stop replaying the broadcast contents that is being replayed.

10. A system for replaying video images, the system comprising:

means for extracting a plurality of thumbnail images from a video stream of a broadcast content requested by a user to replay a video image;

means for placing a bookmark on a thumbnail image among the plurality of thumbnail images, the thumbnail image being most recent one before receiving a request for placing the bookmark;

means for checking whether the bookmark is placed on the broadcast content selected by the user;

means for successively replaying the broadcast content from the thumbnail image of the broadcast content selected by the user;

means for inputting a request for receiving the video stream of the broadcast content, a request for placing the bookmark, and the user's request for replaying the broadcast content selected by the user, and means for moving the bookmark onto a corresponding thumbnail image in response to the user's request to change the bookmark.

11. The system according to claim 10, further comprising means for storing the video stream of the broadcast content, an index to the thumbnail image and a bookmark index.

12. A method of playing back streaming content recorded on a storage medium after streaming content is received by a receiver, the method comprising:

recording streaming content comprising a plurality of images frames on a storage medium for future replay;

generating thumbnail images from selected image frames in the plurality of image frames, wherein each thumbnail image represents to a user a visual presentation of the streaming content at point of selection of each selected image frame;

recognizing a replay point in the streaming content recorded on the storage medium in response to a user request, wherein the replay point is associated with a first thumbnail image that is most recently generated prior to receiving the user request, regardless of the user's intention to replay the streaming content from an image frame that is subsequent in time to an image frame based on which the first thumbnail is generated; and moving the replay point to a corresponding thumbnail image in response to a request to change the replay point.

* * * * *